June 18, 1929.  B. HOROWITZ  1,717,926
TOASTING APPARATUS
Filed Nov. 11, 1927  2 Sheets-Sheet 1
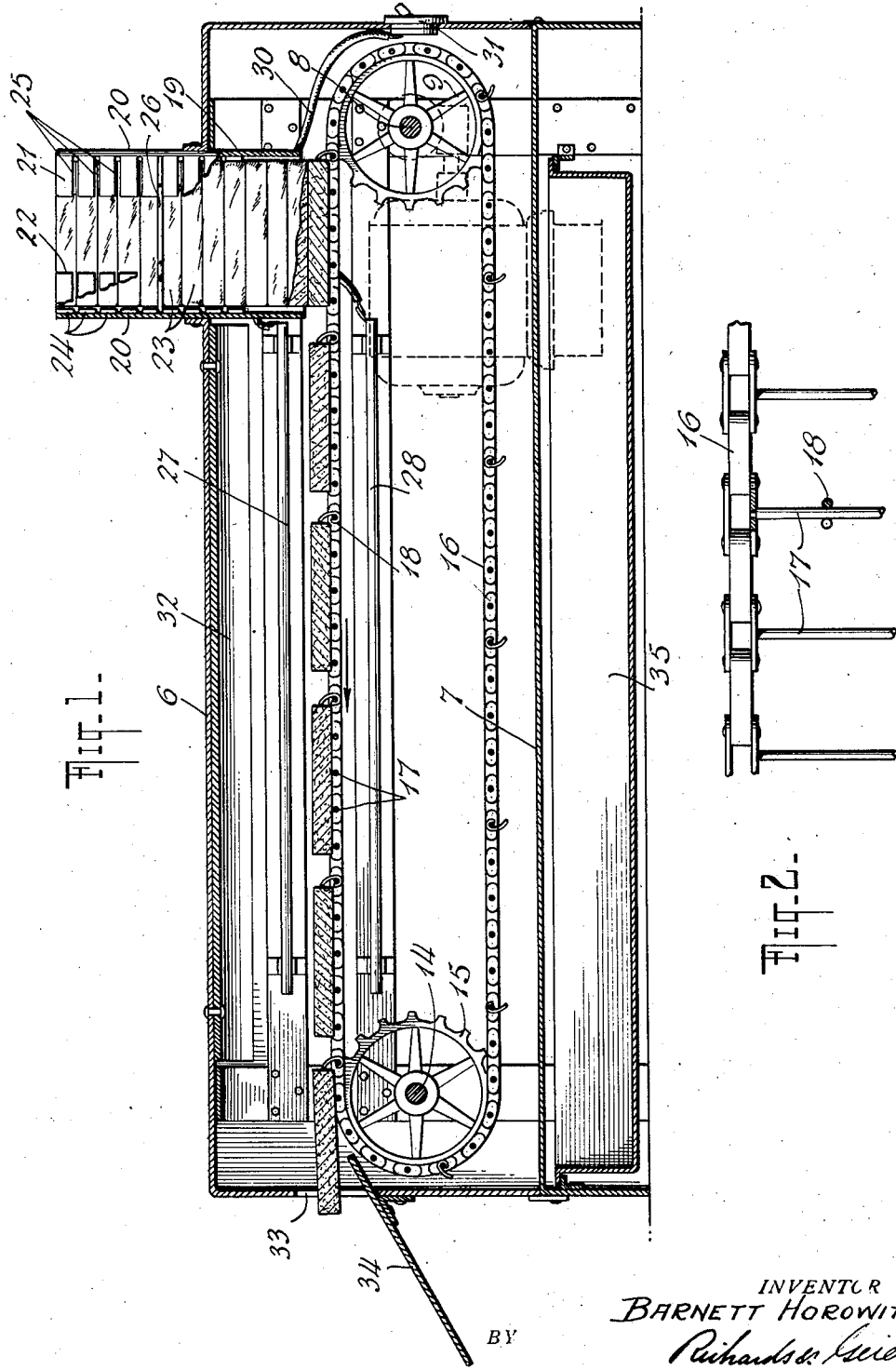
INVENTOR
BARNETT HOROWITZ
BY
*Richards & Geier*
ATTORNEYS

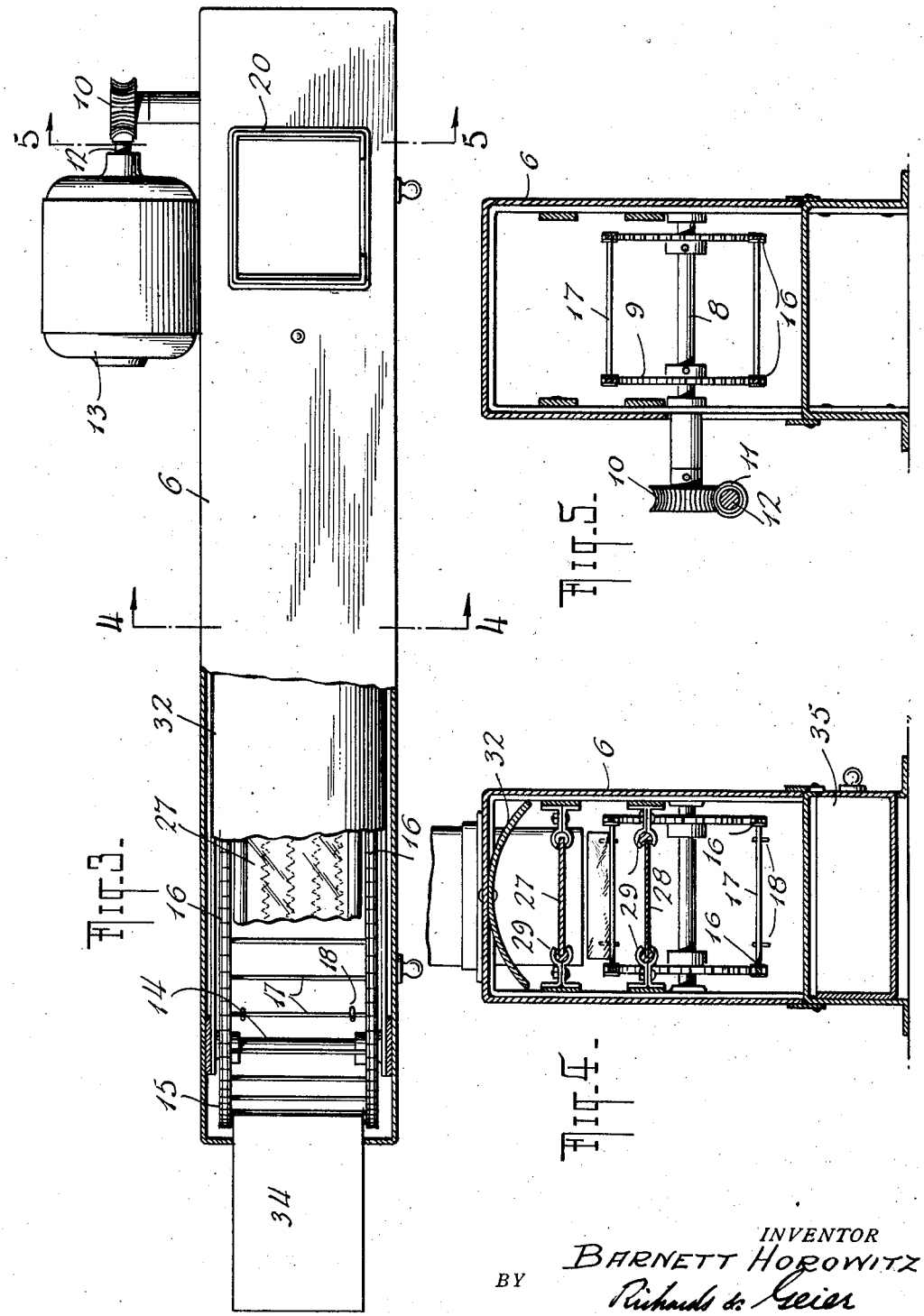

Patented June 18, 1929.

1,717,926

UNITED STATES PATENT OFFICE.

BARNETT HOROWITZ, OF BROOKLYN, NEW YORK.

TOASTING APPARATUS.

Application filed November 11, 1927. Serial No. 232,524.

This invention relates to improvements in bread-toasting apparatus, and has particular reference to an apparatus of this type which is especially useful for restaurant service.

An object of the invention is to provide an improved apparatus of simple and practical construction by means of which it is possible to rapidly toast a large amount of bread.

Another object is to automatically feed bread from a hopper to heating elements between which the bread passes at a rate of speed which will be sufficient to thoroughly toast both sides of the bread simultaneously. To this end, a continuously movable endless conveyor for the slices of bread passes beneath the hopper and successively receives therefrom the slices to be toasted, after which said slices are carried between two heating elements which toast the same, subsequent to which the slices are discharged from the apparatus by the movement of the conveyor.

Another object is to provide a hopper adapted to contain a plurality of slices of bread and in which provision is made for the feeding of only a predetermined number of said slices to the conveyor, the remainder of the slices being held in the hopper for future use.

The above and other objects will appear more clearly from the following detail description, when taken in connection with the accompanying drawings, which illustrate a preferred embodiment of the inventive idea.

In the drawings—

Figure 1 is a vertical longitudinal section, partly in elevation, of the toasting apparatus constructed in accordance with the invention;

Figure 2 is a fragmentary plan view of the endless conveyor used;

Figure 3 is a top plan view, partly broken away;

Figure 4 is a transverse section on the line 4—4 of Figure 3; and

Figure 5 is a similar section on the line 5—5 of Figure 3.

Referring more particularly to the accompanying drawings the numeral 6 designates a casing of elongated formation and having a bottom 7 which forms a compartment in which the toasting of the bread is accomplished. Adjacent one end of the casing there is mounted a transverse drive shaft 8 carrying a pair of sprocket wheels 9 and said shaft extends exteriorly of the rear of the casing and is provided at its outer end with a gear 10 adapted to be driven from the worm 11 of a shaft 12 operated from a suitable driving means such as an electric motor 13, the gearing between the shaft 8 and motor being such that said shaft will be driven at a rate of speed sufficiently slow to permit of the slices of bread being thoroughly toasted as they pass from one end of the apparatus to the other in the manner to be presently described. Adjacent the other end of the casing there is provided a second shaft 14 also carrying two sprocket wheels 15.

The conveyor of the apparatus comprises two endless elements 16 in the form of sprocket chains, each of which extends around one pair of the sprocket wheels 9, 15 so that when the wheels 9 are driven from the shaft 8 said sprocket chains will rotate in unison. At suitable intervals along the conveyor the opposed elements 16 are connected by transversely extending bread-supporting bars 17 which carry the slices of bread during the toasting operation. At regularly spaced intervals substantially equal to the width of a slice of bread certain of the bars 17 are each provided with a pair of slice-engaging elements 18 in the form of fingers or abutments adapted to engage a slice of bread as the same is fed to the conveyor so as to hold the slice in the same relative position on the latter until the toasted slice is discharged from the casing.

At the end of the casing 6 adjacent the shaft 8 there is provided a vertically extending hopper 19, a portion of which extends into the casing while the remainder thereof projects above the same. This hopper is open at its upper and lower ends and the latter end is situated directly above the conveyor so that the slices of bread will be fed on to the bars 17 thereof in proper position. The hopper includes side walls 20 and a front wall 21, the latter having a vertical opening 22 extending centrally thereof to facilitate the insertion of a stack of slices 23 into the hopper. Means are provided for feeding only a predetermined number of the slices in the stack to the conveyor should the toasting of all of the slices in the hopper not be required. This means may consist of spaced strips 24 arranged horizontally on the inner sides of the walls 20 of the hopper to form grooves therebetween at a distance apart substantially equal to the thickness of the slices of bread, which grooves are aligned with slots 25 formed in the portions of the front wall 21. Assuming now that it is desired to only toast eight slices of the stack, a plate 26 is inserted into the opposed slots 25 and the grooves aligned therewith between the eighth lowermost slice 23 and the slice directly thereabove so that the plate, when in position, will form a support for the remaining slices in the stack. As the conveyor is operated the lowermost slice in the hopper will be engaged by a pair of fingers 18 and carried by the movement of the conveyor from beneath the stack whereupon the remaining seven slices to be toasted will move downwardly in the hopper by gravity until the next lowermost slice comes in contact with the bars 17 which are at the time located just below the hopper. The next succeeding pair of fingers 18 will then engage the lowermost slice and carry the same from beneath the stack and in this manner various slices will be successively fed upon the conveyor.

After being carried from beneath the hopper the slices 23 are moved between upper and lower heating elements, conventionally shown at 27 and 28 and mounted on opposite sides of the upper flight of the conveyer in suitable brackets 29 secured in opposed relation to the walls of the casing 6. These heating elements are supplied with electric current through branches of a conductor 30 connected to a suitable switch 31 mounted in one end of the casing 6, which switch is in turn connected to a source of current supply. In order to intensify the heat within the casing and thus aid in rapidly toasting the bread, a reflector 32 of arcuate formation in cross section is secured to the top of the casing 6 in overhanging relation to the heating elements 27 and 28.

At the end of the casing 6 opposite the hopper 19 said casing is provided with a discharge outlet 33 through which the slices of bread, after being toasted, are passed on to an inclined platform 34 which will deposit the slices outside of the casing.

In order to keep the toasted bread in a warm condition in the event that it is not immediately used, the bottom of the casing 6 is provided with a sliding drawer 35 into which the toasted bread may be deposited until ready for use.

What is claimed is:

In a bread-toasting apparatus, heating elements, a conveyor movable between said heating elements and to which slices of bread are fed, a hopper in which a plurality of slices of bread are stacked and which includes side and front walls, the latter having a vertical opening and transverse slots on opposite sides of said opening, opposed supporting strips on the side walls of said hopper aligned with the slots in said front wall, and a separating plate insertable through the slots in said front wall between two slices of bread and engageable with opposite strips to permit only the slices below said plate to be fed on to said conveyor.

In testimony whereof I have affixed my signature.

BARNETT HOROWITZ.